US012080173B2

(12) United States Patent
Teague et al.

(10) Patent No.: US 12,080,173 B2
(45) Date of Patent: Sep. 3, 2024

(54) AIRCRAFT SYSTEM AND METHOD TO DISPLAY AIR TRAFFIC INDICATORS

(71) Applicant: Rockwell Collins, Inc., Cedar Rapids, IA (US)

(72) Inventors: Jacob Teague, West Melbourne, FL (US); Christopher Crain, Palm Bay, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 808 days.

(21) Appl. No.: 17/028,425

(22) Filed: Sep. 22, 2020

(65) Prior Publication Data

US 2022/0092991 A1 Mar. 24, 2022

(51) Int. Cl.
*G08G 5/00* (2006.01)
*G08G 5/04* (2006.01)

(52) U.S. Cl.
CPC ......... *G08G 5/0021* (2013.01); *G08G 5/0047* (2013.01); *G08G 5/0078* (2013.01); *G08G 5/045* (2013.01)

(58) Field of Classification Search
None
See application file for complete search history.

(56) References Cited

U.S. PATENT DOCUMENTS 3,846,746 A * 11/1974 Trageser .................. G01S 1/02 340/961
6,124,825 A 9/2000 Eschenbach
6,571,177 B1 5/2003 Hardy
6,911,936 B2 6/2005 Stayton et al.
6,927,703 B2 8/2005 Watson
7,408,552 B2 8/2008 Kellman et al.
7,747,360 B2 6/2010 Canu-Chiesa et al.
8,160,755 B2 4/2012 Nichols et al.
8,271,186 B2 9/2012 Nouvel et al.
8,315,787 B2 11/2012 Shafaat et al.
8,736,465 B2 5/2014 Rutherford et al.
(Continued)

FOREIGN PATENT DOCUMENTS

EP 2720215 A1 4/2014
EP 2345872 B1 12/2017

OTHER PUBLICATIONS

Extended Search Report in European Application No. 21198318.4 dated Feb. 7, 2022, 6 pages.

*Primary Examiner* — Whitney Moore
(74) *Attorney, Agent, or Firm* — Suiter Swantz IP

(57) ABSTRACT

A system may include a display and a processor installed in an aircraft. The processor may be configured to: obtain air traffic data; generate a display image based at least on the air traffic data; and output the display image. The display may display the display image to a user. The display image may convey a range dimension and a horizontal dimension. The display image may depict at least one air traffic indicator. Each of the at least one air traffic indicator may be positioned respective to a corresponding range and horizontal location relative to the aircraft. Each of the at least one air traffic indicator may indicate at least one of: an amount of a vertical distance of air traffic above the aircraft, an amount of a vertical distance of air traffic below the aircraft, or that air traffic has an approximately equal altitude as the aircraft.

10 Claims, 8 Drawing Sheets

(56) References Cited

U.S. PATENT DOCUMENTS

| | | | |
|---|---|---|---|
| 8,773,288 | B1 | 7/2014 | Carrico et al. |
| 9,105,183 | B2 | 8/2015 | Samuthirapandian et al. |
| 9,142,133 | B2 | 9/2015 | Palanisamy et al. |
| 9,147,349 | B2 | 9/2015 | Maddanimath et al. |
| 9,401,091 | B2 | 7/2016 | N et al. |
| 9,501,936 | B2 | 11/2016 | Trefilova et al. |
| 9,718,558 | B2 | 8/2017 | Ball et al. |
| 2010/0194601 | A1 | 8/2010 | Servantie et al. |
| 2014/0104080 | A1* | 4/2014 | Maddanimath ...... G08G 5/0021 340/945 |
| 2018/0315321 | A1 | 11/2018 | Servantie et al. |
| 2020/0020239 | A1 | 1/2020 | Chen et al. |

* cited by examiner

AIRCRAFT SYSTEM AND METHOD TO DISPLAY AIR TRAFFIC INDICATORS

BACKGROUND

Air traffic density is expected to continue to increase with the advent of urban air mobility (UAM), which could clutter traffic displays. UAM may also accelerate a need for single pilot capable systems to keep up with demand.

SUMMARY

In one aspect, embodiments of the inventive concepts disclosed herein are directed to a system. The system may include at least one display installed in an aircraft. The system may include at least one processor installed in the aircraft and communicatively coupled to the at least one display. The at least one processor may be configured to: obtain air traffic data associated with air traffic; generate a display image based at least on the air traffic data; and output the display image as graphical data. The at least one display may be configured to display the display image to a user. The display image may convey a range dimension and a horizontal dimension. The display image may depict at least one air traffic indicator. Each of the at least one air traffic indicator may be positioned respective to a corresponding range and horizontal location relative to the aircraft. Each of the at least one air traffic indicator may indicate at least one of: an amount of a vertical distance of air traffic above the aircraft, an amount of a vertical distance of air traffic below the aircraft, or that air traffic has an approximately equal altitude as the aircraft.

In a further aspect, embodiments of the inventive concepts disclosed herein are directed to a method. The method may include: obtaining, by at least one processor installed in an aircraft and communicatively coupled to at least one display installed in the aircraft, air traffic data associated with air traffic; generating, by the at least one processor, a display image based at least on the air traffic data; outputting, by the at least one processor, the display image as graphical data; and displaying, by the at least one display, the display image to a user; wherein the display image conveys a range dimension and a horizontal dimension, wherein the display image depicts at least one air traffic indicator, each of the at least one air traffic indicator positioned respective to a corresponding range and horizontal location relative to the aircraft, wherein each of the at least one air traffic indicator indicates at least one of: an amount of a vertical distance of air traffic above the aircraft, an amount of a vertical distance of air traffic below the aircraft, or that air traffic has an approximately equal altitude as the aircraft.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1B:
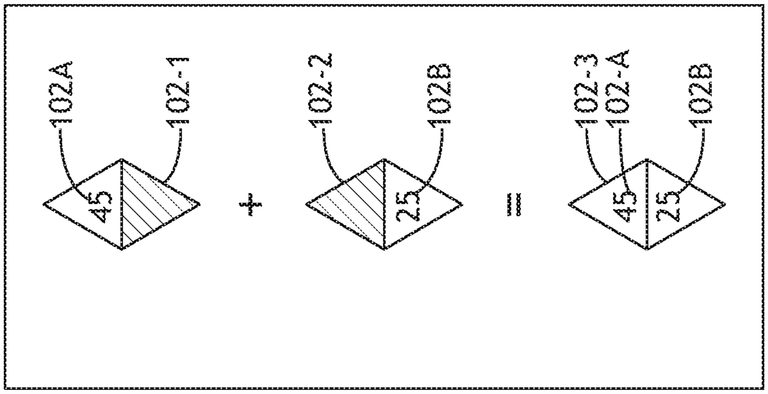
FIG. 1B is a view of an exemplary embodiment of air traffic indicators according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to display at least one air traffic indicator. Some embodiments may provide comprehensive graphics that declutter the display, which may be important in reducing pilot workload for single pilot operation. Some embodiments may simplify traffic avoidance while increasing operational efficiency and improving safety.

Some embodiments may consolidate information of air traffic within a single air traffic indicator. For example, filling a top-half of the air traffic indicator with a top-half numerical value may indicate traffic above an ownship by an amount indicated by the top-half numerical value. For example, filling a bottom-half of the air traffic indicator with a bottom-half numerical value may indicate traffic below an ownship by an amount indicated by the bottom-half numerical value. Some embodiments may include a priority scheme where, if air traffic includes at least two aircraft that if depicted separately would have overlapping air traffic indicators, a combined air traffic indicator representing the at least two aircraft may be used. For example, if two aircraft are both above or both below, the combined air traffic indicator may indicate a numerical value for the vertically closest aircraft to the ownship due to greater proximity threat.

Referring now to FIGS. 1A, 1B, 1C, 1D, and 2 exemplary embodiments of at least one air traffic indicator 102 that may be depicted in a display image 200 are shown. The display image 200 may convey a range dimension and a horizontal dimension. The display image 200 may depict at least one air traffic indicator 102. Each of the at least one air traffic indicator 102 may be positioned (e.g., in the display image 200) respective to a corresponding range and horizontal location relative to a position of the aircraft (e.g., 302), wherein each of the at least one air traffic indicator indicates at least one of: an amount of a vertical distance of air traffic (e.g., an air traffic target) above the aircraft (e.g., 302), an amount of a vertical distance of air traffic (e.g., an air traffic target) below the aircraft (e.g., 302), or that air traffic (e.g., an air traffic target) has an approximately equal altitude as the aircraft (e.g., 302).

Figure 1A:
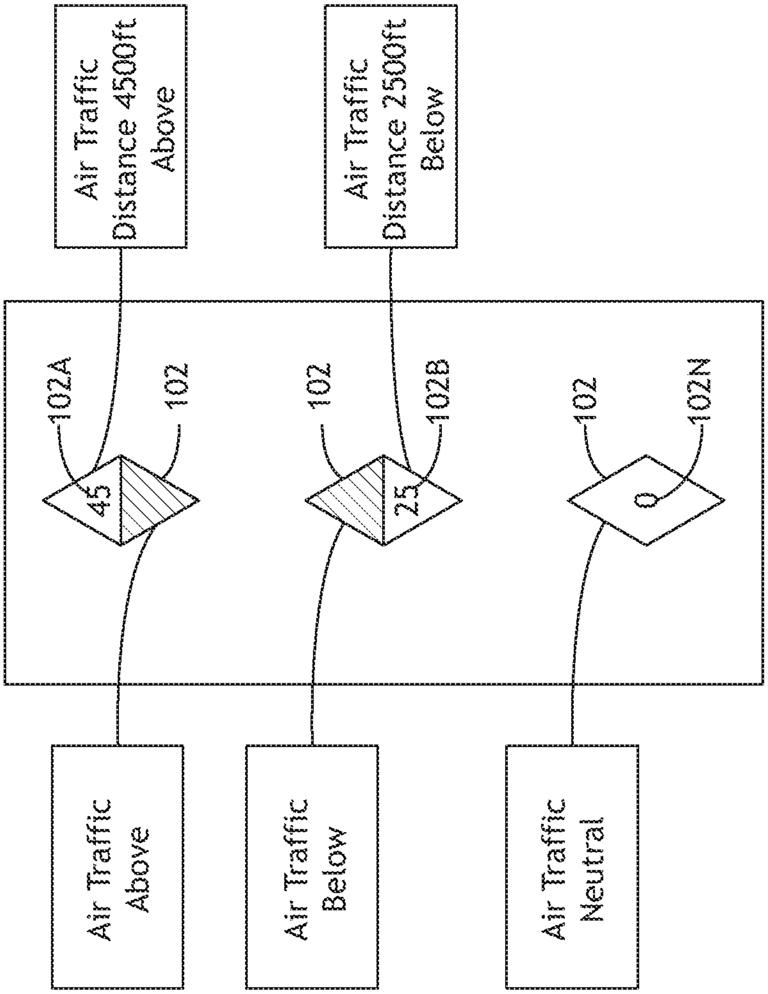
FIG. 1A is a view of an exemplary embodiment of air traffic indicators according to the inventive concepts disclosed herein.

As shown in FIG. 1A, three exemplary air traffic indicators 102 are shown. Each of the three air traffic indicators 102 may depict at least one numerical value (e.g., a top-half numerical value 102A, bottom-half numerical value 102B, and/or a zero value 102N). For example, a first air traffic indicator 102 may have a top-half numerical value 102A positioned in a top half of the first air traffic indicator 102, a second air traffic indicator 102 may have a bottom-half numerical value 102B positioned in a bottom half of the second air traffic indicator 102, and a third air traffic indicator 102 may have a zero value 102N. The top-half numerical value 102A may indicate the amount (e.g., "45" indicates air traffic is 4,500 feet above the aircraft) of the vertical distance of the air traffic (e.g., an air traffic target) above the aircraft (e.g., 302). The bottom-half numerical value 102B may indicate the amount (e.g., "25" indicates air traffic is 2,500 feet below the aircraft) of the vertical distance of the air traffic (e.g., an air traffic target) below the aircraft (e.g., 302). The zero value 102N may indicate that the air traffic (e.g., an air traffic target) has an approximately equal (e.g., 0+/−50 feet) altitude as the aircraft (e.g., 302).

Each air traffic indicator 102 may have any suitable geometric shape (e.g., defined by at least one line and/or at least one curve; e.g., a diamond shape, as shown).

Figure 1D:
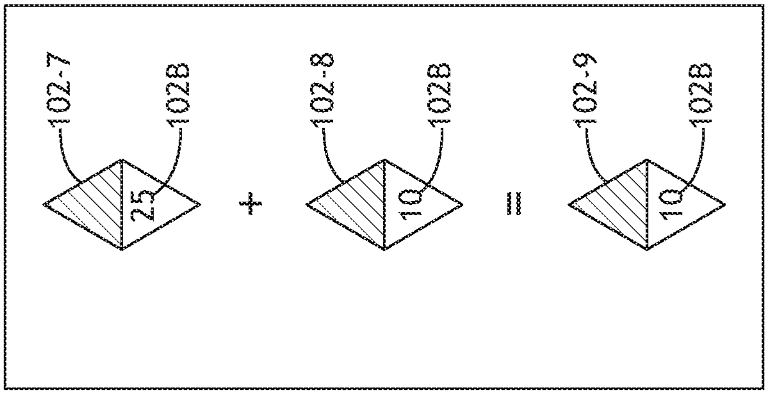
FIG. 1D is a view of an exemplary embodiment of air traffic indicators according to the inventive concepts disclosed herein.
Figure 1C:
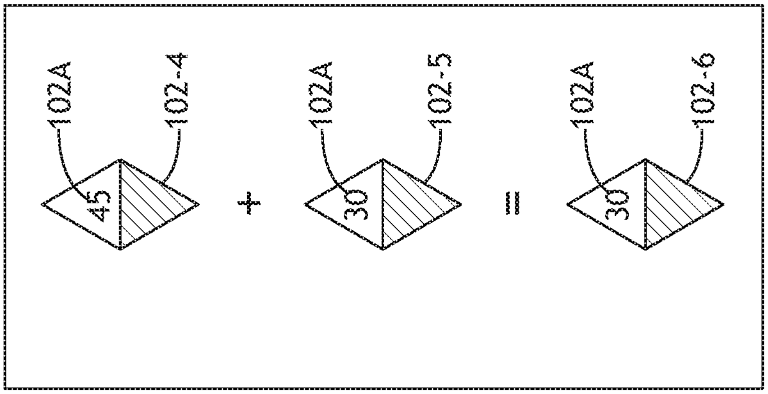
FIG. 1C is a view of an exemplary embodiment of air traffic indicators according to the inventive concepts disclosed herein.

As shown in FIGS. 1B, 1C, and 1D, some air traffic indicators 102 may be combined aircraft indicators (e.g., 102-3, 102-6, or 102-9). If air traffic includes at least two aircraft that if depicted separately would have overlapping air traffic indicators 102 (e.g., 102-1, 102-2, 102-4, 102-5, 102-7, and/or 102-8), a combined air traffic indicator (e.g., 102-3, 102-6, or 102-9) representing the at least two aircraft can be used to declutter the display image 200.

As shown in FIG. 1B, in some embodiments, rather than displaying air traffic indicators 102-1 (having a top-half numerical value 102A), 102-2 (having a bottom-half numerical value 102B) that would overlap (e.g., in the display image 200) based on the two air traffic targets having close horizontal and range location relative to the aircraft (e.g., 302), a combined air traffic indicator 102-3 representing the two air traffic targets can be used to declutter the display image 200. The combined air traffic indicator 102-3 can include a top-half numerical value 102A and a bottom-half numerical value 102B.

As shown in FIG. 1C, in some embodiments, rather than displaying air traffic indicators 102-4 (having a top-half numerical value 102A), 102-5 (having a top-half numerical value 102A) that would overlap (e.g., in the display image 200) based on the two air traffic targets having close horizontal and range location relative to the aircraft (e.g., 302), a combined air traffic indicator 102-6 representing the two air traffic targets can be used to declutter the display image 200. The combined air traffic indicator 102-6 can include a top-half numerical value 102A for the air traffic target that is vertically closest to the aircraft (e.g., 302) as that is the closest threat to the aircraft (e.g., 302).

As shown in FIG. 1D, in some embodiments, rather than displaying air traffic indicators 102-7 (having a bottom-half numerical value 102B), 102-8 (having a bottom-half numerical value 102B) that would overlap (e.g., in the display image 200) based on the two air traffic targets having close horizontal and range location relative to the aircraft (e.g., 302), a combined air traffic indicator 102-9 representing the two air traffic targets can be used to declutter the display image 200. The combined air traffic indicator 102-9 can include a bottom-half numerical value 102B for the air traffic target that is vertically closest to the aircraft (e.g., 302) as that is the closest threat to the aircraft (e.g., 302).

Figure 2:
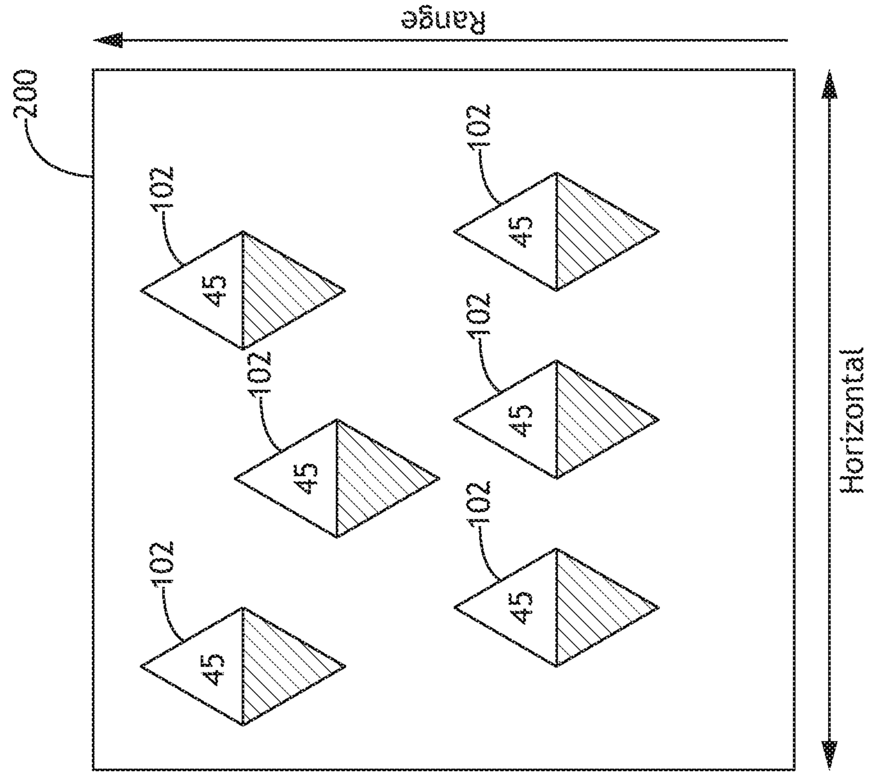
FIG. 2 is a view of an exemplary embodiment of a display image including air traffic indicators of FIGS. 1A, 1B, 1C, and/or 1D according to the inventive concepts disclosed herein.
Figure 3:
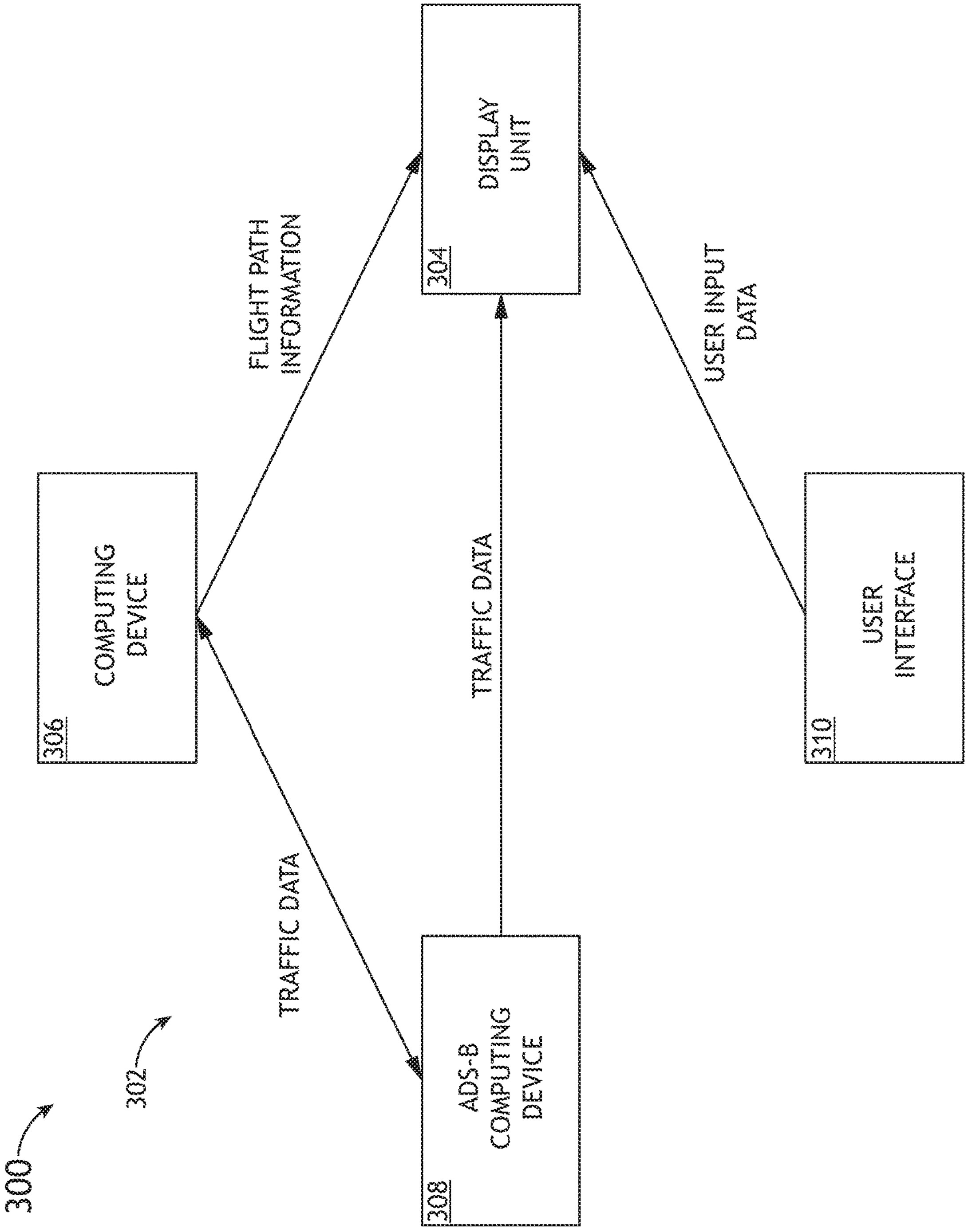
FIG. 3 is a view of an exemplary embodiment of a system according to the inventive concepts disclosed herein.

As shown in FIG. 2, an exemplary embodiment of the display image 200 depicting air traffic indicators 102 is shown. The display image 200 may convey a range dimension and a horizontal dimension. The display image 200 may depict at least one air traffic indicator 102. Each of the at least one air traffic indicator 102 may be positioned (e.g., in the display image 200) respective to a corresponding range and horizontal location relative to a position of the aircraft (e.g., 302).

Referring now to FIGS. 3-6, an exemplary embodiment of a system 300 according to the inventive concepts disclosed herein is depicted. In some embodiments, the system may include an aircraft 302, which may include at least one user (e.g., flight crew and/or pilot(s)), at least one display unit computing device 304, at least one aircraft computing device 306, at least one automatic dependent surveillance-broadcast (ADS-B) computing device 308, and/or at least one user interface 310, some or all of which may be communicatively coupled at any given time. In some embodiments, the at least one display unit computing device 304, the at least one aircraft computing device 306, the at least one ADS-B computing device 308, and/or the at least one user interface 310 may be implemented as a single computing device or any number of computing devices configured to perform (e.g., collectively perform if more than one computing device) any or all of the operations disclosed throughout. The at least one display unit computing device 304, the at least one aircraft computing device 306, the at least one ADS-B computing device 308, and/or the at least one user interface 310 may be installed in the aircraft 302.

The user may be a pilot or crew member. The user may interface with the system 300 via the at least one user interface 310. The at least one user interface 310 may be implemented as any suitable user interface, such as a touchscreen (e.g., of the display unit computing device 304 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 310 may be configured to receive at least one user input and to output the at least one user input to a computing device (e.g., 304, 306, and/or 308). For example, a pilot of the aircraft 104 may be able to interface with the user interface 310 to: engage (or disengage) a mode to cause the display image 200 to be displayed. For example, such user inputs may be output to the ADS-B computing device 308 and/or the display unit computing device 304.

Figure 4:
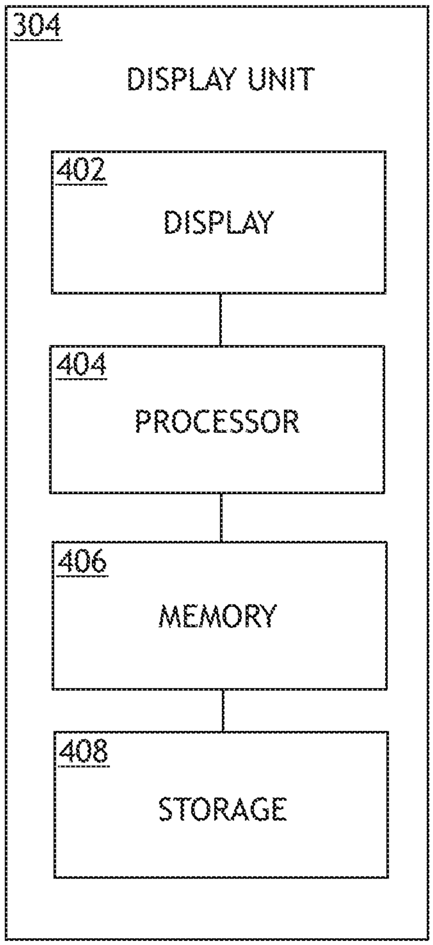
FIG. 4 is a view of an exemplary embodiment of a display unit computing device of the system of FIG. 3 according to the inventive concepts disclosed herein.

The display unit computing device 304 may be implemented as any suitable computing device, such as a primary flight display (PFD) computing device and/or a multifunction window (MFW) display computing device. As shown in FIG. 4, the display unit computing device 304 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: obtain air traffic data (e.g., automatic dependent surveillance-broadcast (ADS-B) data from the ADS-B computing device 308) associated with air traffic; obtain aircraft data (e.g., from the computing device 306); generate a display image 200 based at least on the air traffic data and/or the aircraft data; and/or output the display image 200 as graphical data. The display 402 may be configured to display the display image 200 to a user.

Figure 5:
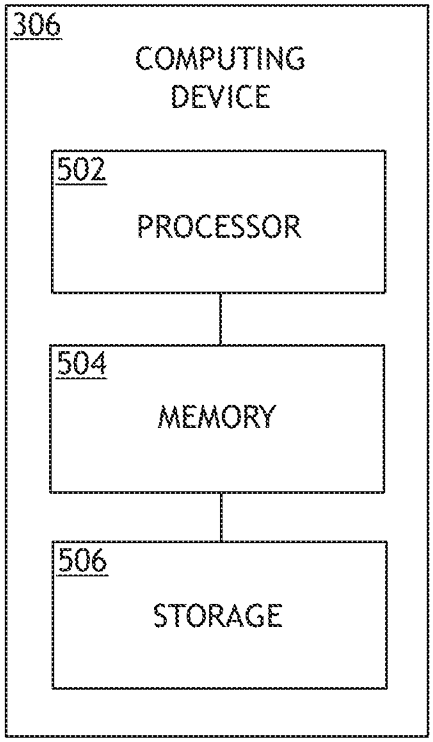
FIG. 5 is a view of an exemplary embodiment of an aircraft computing device of the system of FIG. 3 according to the inventive concepts disclosed herein.
Figure 6:
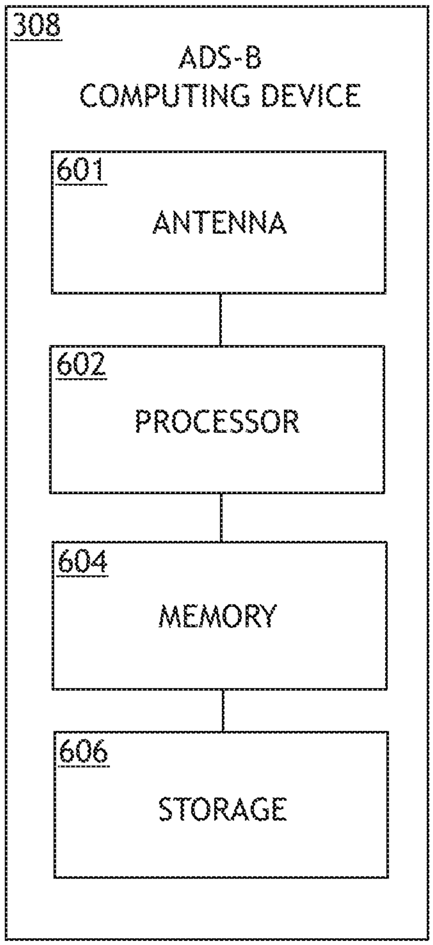
FIG. 6 is a view of an exemplary embodiment of an ADS-B computing device of the system of FIG. 3 according to the inventive concepts disclosed herein.

The at least one aircraft computing device 306 may be implemented as any suitable computing device, such as a flight management system (FMS) computing device or a flight data computer. The at least one aircraft computing device 306 may include any or all of the elements, as shown in FIG. 5. For example, the aircraft computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an FMS application) or computer code stored (e.g., maintained) in a non-transitory computer-readable medium (e.g., memory 504 and/or storage 506) and configured to execute various instructions or operations. The processor 502 of the aircraft computing device 306 may be configured to perform any or all of the operations disclosed throughout. For example, the processor 502 of the computing device 210A may be configured to: output aircraft data (e.g., FMS data, flight path data, inertial reference unit (IRU) data, flight data, and/or flight computer data) to the display unit computing device 304 and/or the ADS-B computing device 308.

The at least one ADS-B computing device 308 may be implemented as any suitable computing device, such as an ADS-B receiver computing device. The at least one ADS-B computing device 308 may include any or all of the elements shown in FIG. 6. For example, the ADS-B computing device 308 may include at least one antenna 601, at least one processor 602, at least one memory 604, and/or at least one storage 606, some or all of which may be communicatively coupled at any given time. For example, the at least one processor 602 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 602 may include a CPU and a GPU configured to perform (e.g., collectively perform) any of the operations disclosed throughout. The processor 602 may be configured to run various software applications (e.g., an ADS-B application) or computer code stored (e.g., maintained) in a non-transitory computer-readable medium (e.g., memory 604 and/or storage 606) and configured to execute various instructions or operations. The processor 602 of the ADS-B computing device 308 may be configured to perform any or all of the operations disclosed throughout. For example, the processor 602 may be configured to: obtain air traffic data; and/or output air traffic data to the display unit computing device 304 and/or the aircraft computing device 306.

For example, at least one processor (e.g., the at least one processor 404, the at least one processor 502, and/or the at least one processor 602) may be configured to (e.g., collectively configured to, if more than one processor): obtain air traffic data associated with air traffic; generate a display image 200 based at least on the air traffic data; and output the display image 200 as graphical data.

At least one processor (e.g., the at least one processor 404, the at least one processor 502, and/or the at least one processor 602) of the aircraft 302 may be configured to perform (e.g., collectively perform) any or all of the operations disclosed throughout.

Figure 7:
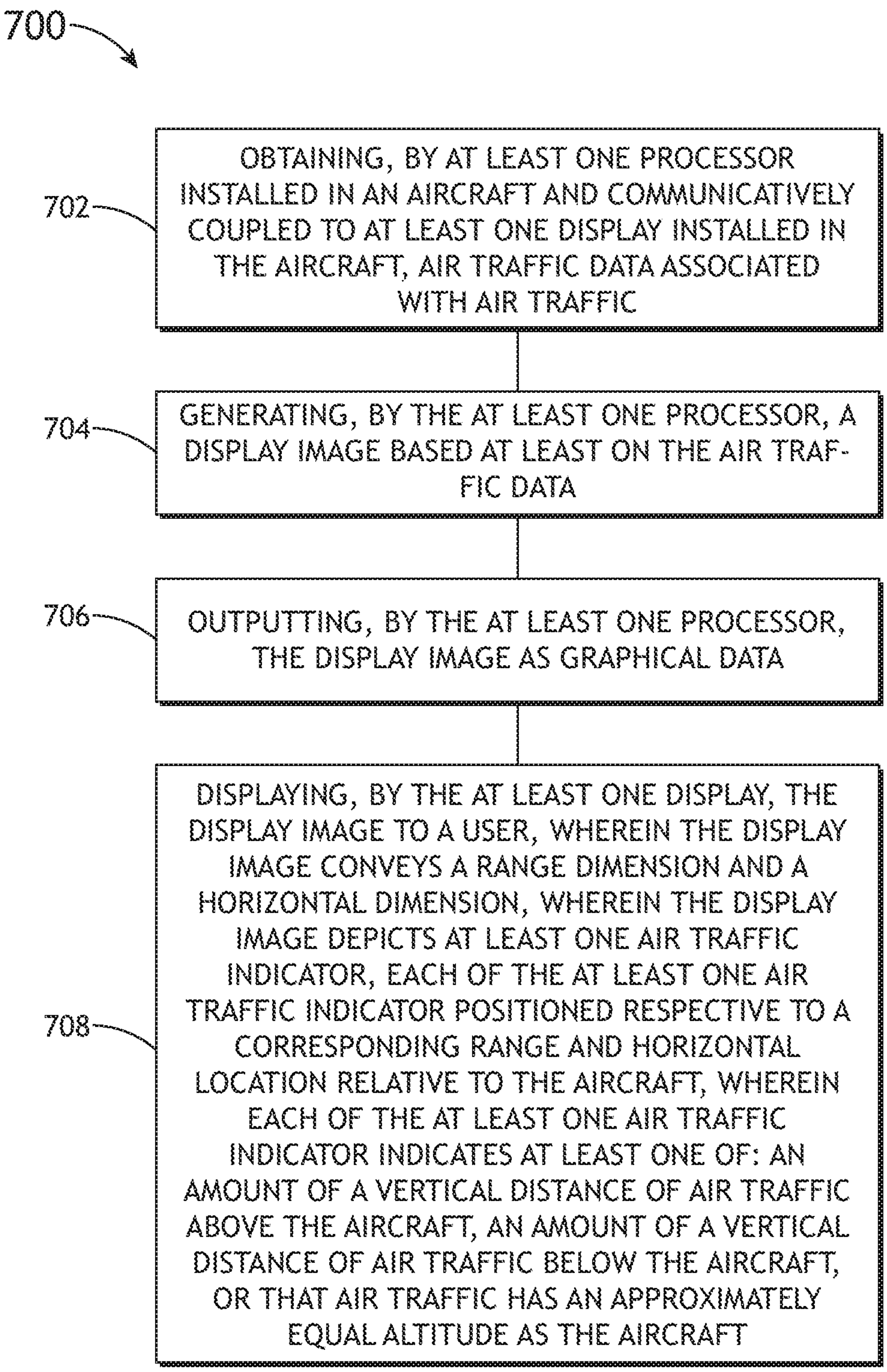
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor installed in an aircraft and communicatively coupled to at least one display installed in the aircraft, air traffic data associated with air traffic.

A step 704 may include generating, by the at least one processor, a display image based at least on the air traffic data.

A step 706 may include outputting, by the at least one processor, the display image as graphical data.

A step 708 may include displaying, by the at least one display, the display image to a user, wherein the display image conveys a range dimension and a horizontal dimension, wherein the display image depicts at least one air traffic indicator, each of the at least one air traffic indicator positioned respective to a corresponding range and horizontal location relative to the aircraft, wherein each of the at least one air traffic indicator indicates at least one of: an amount of a vertical distance of air traffic above the aircraft, an amount of a vertical distance of air traffic below the aircraft, or that air traffic has an approximately equal altitude as the aircraft.

Further, the method 700 may include any of the operations disclosed throughout.

As will be appreciated from the above, embodiments of the inventive concepts disclosed herein may be directed to a system (e.g., an aircraft system) and a method configured to display at least one air traffic indicator.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:

at least one display installed in an aircraft; and at least one processor installed in the aircraft and communicatively coupled to the at least one display, the at least one processor configured to:

obtain air traffic data associated with air traffic, the air traffic including at least one air traffic aircraft;

generate a display image based at least on the air traffic data; and output the display image as graphical data;

wherein the at least one display is configured to display the display image to a user;

wherein the display image conveys a range dimension and a horizontal dimension, wherein the display image depicts at least one air traffic indicator, wherein each of the at least one air traffic indicator represents one air traffic aircraft of the at least one air traffic aircraft, wherein each said air traffic aircraft is represented by a single indicator of the at least one air traffic indicator, each of the at least one air traffic indicator positioned respective to a corresponding range and horizontal location relative to the aircraft, wherein each of the at least one air traffic indicator indicates at least one of: an amount of a vertical distance of air traffic above the aircraft, an amount of a vertical distance of air traffic below the aircraft, or that air traffic has an approximately equal altitude as the aircraft;

wherein each of the at least one air traffic indicator depicts at least one numerical value, each of the at least one numerical value indicating the amount of the vertical distance of the air traffic above the aircraft, the amount of the vertical distance of the air traffic below the aircraft, or that the air traffic has the approximately equal altitude as the aircraft;

wherein a top-half numerical value of the at least one numerical value positioned in a top half of one of the at least one air traffic indicator indicates the amount of the vertical distance of the air traffic above the aircraft;

wherein a bottom-half numerical value of the at least one numerical value positioned in a bottom half of one of the at least one air traffic indicator indicates the amount of the vertical distance of the air traffic below the aircraft;

wherein the air traffic includes at least two aircraft that if depicted separately would have overlapping air traffic indicators for where all of the at least two aircraft are one of above or below the aircraft, wherein the at least one air traffic indicator includes a combined air traffic indicator representing the at least two aircraft, wherein the combined air traffic indicator has no more than one of the top-half numerical value, wherein the combined air traffic indicator has no more than one of the bottom-half numerical value.

2. The system of claim 1, wherein a zero value of the at least one numerical value of the at least one air traffic indicator indicates that the air traffic has the approximately equal altitude as the aircraft.

3. The system of claim 1, wherein each of the at least one air traffic indicator has a geometric shape.

4. The system of claim 3, wherein the geometric shape is a diamond shape.

5. The system of claim 1, wherein the at least two aircraft are above the aircraft, wherein the combined air traffic indicator has a given top-half numerical value corresponding to one of the at least two aircraft that is vertically closest to the aircraft.

6. The system of claim 1, wherein the at least two aircraft are below the aircraft, wherein the combined air traffic indicator has a given bottom-half numerical value corresponding to one of the at least two aircraft that is vertically closest to the aircraft.

7. The system of claim 1, wherein the at least two aircraft are below the aircraft, wherein another at least two aircraft are above the aircraft, wherein the combined air traffic indicator has a given bottom-half numerical value corresponding to one of the at least two aircraft below the aircraft that is vertically closest to the aircraft, wherein the combined air traffic indicator has a given top-half numerical value corresponding to one of the another at least two aircraft above the aircraft that is vertically closest to the aircraft.

8. The system of claim 1, wherein the air traffic data is automatic dependent surveillance-broadcast (ADS-B) data.

9. The system of claim 8, wherein each of the at least one air traffic indicator has a diamond shape.

10. A method, comprising:

obtaining, by at least one processor installed in an aircraft and communicatively coupled to at least one display installed in the aircraft, air traffic data associated with air traffic, the air traffic including at least one air traffic aircraft;

generating, by the at least one processor, a display image based at least on the air traffic data;

outputting, by the at least one processor, the display image as graphical data; and displaying, by the at least one display, the display image to a user;

wherein the display image conveys a range dimension and a horizontal dimension, wherein the display image depicts at least one air traffic indicator, wherein each of the at least one air traffic indicator represents one air traffic aircraft of the at least one air traffic aircraft, wherein each said air traffic aircraft is represented by a single indicator of the at least one air traffic indicator, each of the at least one air traffic indicator positioned respective to a corresponding range and horizontal location relative to the aircraft, wherein each of the at least one air traffic indicator indicates at least one of: an amount of a vertical distance of air traffic above the aircraft, an amount of a vertical distance of air traffic below the aircraft, or that air traffic has an approximately equal altitude as the aircraft;

wherein each of the at least one air traffic indicator depicts at least one numerical value, each of the at least one numerical value indicating the amount of the vertical distance of the air traffic above the aircraft, the amount of the vertical distance of the air traffic below the aircraft, or that the air traffic has the approximately equal altitude as the aircraft;

wherein a top-half numerical value of the at least one numerical value positioned in a top half of one of the at least one air traffic indicator indicates the amount of the vertical distance of the air traffic above the aircraft;

wherein a bottom-half numerical value of the at least one numerical value positioned in a bottom half of one of the at least one air traffic indicator indicates the amount of the vertical distance of the air traffic below the aircraft;

wherein the air traffic includes at least two aircraft that if depicted separately would have overlapping air traffic indicators for where all of the at least two aircraft are one of above or below the aircraft, wherein the at least one air traffic indicator includes a combined air traffic indicator representing the at least two aircraft, wherein the combined air traffic indicator has no more than one of the top-half numerical value, wherein the combined air traffic indicator has no more than one of the bottom-half numerical value.

* * * * *